(12) United States Patent
Berthereau et al.

(10) Patent No.: US 8,367,571 B2
(45) Date of Patent: Feb. 5, 2013

(54) GLASS STRANDS WITH LOW ALUMINA CONTENT CAPABLE OF REINFORCING ORGANIC AND/OR INORGANIC MATERIALS

(75) Inventors: Anne Berthereau, Challes les Eaux (FR); Emmanuelle Picard, Paris (FR); Jerome Lalande, Saint-Maur des Fosse (FR)

(73) Assignee: Saint-Gobain Technical Fabrics Europe, Chambery (FR)

( * ) Notice: Subject to any disclaimer, the term of this patent is extended or adjusted under 35 U.S.C. 154(b) by 309 days.

(21) Appl. No.: 12/739,871

(22) PCT Filed: Oct. 30, 2008

(86) PCT No.: PCT/FR2008/051953
§ 371 (c)(1),
(2), (4) Date: Apr. 26, 2010

(87) PCT Pub. No.: WO2009/056768
PCT Pub. Date: May 7, 2009

(65) Prior Publication Data
US 2010/0248928 A1  Sep. 30, 2010

(30) Foreign Application Priority Data
Oct. 31, 2007 (FR) .................................... 07 58731

(51) Int. Cl.
C03C 13/06 (2006.01)
C03C 13/00 (2006.01)
C03C 3/087 (2006.01)

(52) U.S. Cl. .............................. 501/36; 501/35; 501/70
(58) Field of Classification Search .................. 501/35, 501/36, 70
See application file for complete search history.

(56) References Cited

U.S. PATENT DOCUMENTS

| | | | |
|---|---|---|---|
| 3,013,888 A | | 12/1961 | De Lajarte |
| 4,203,774 A | * | 5/1980 | Battigelli et al. ............... 501/35 |
| 4,312,952 A | * | 1/1982 | Carbol ............................ 501/36 |
| 4,325,724 A | * | 4/1982 | Froberg .......................... 65/474 |
| 4,381,347 A | * | 4/1983 | Carbol ............................ 501/36 |
| 4,756,732 A | * | 7/1988 | Barthe et al. .................... 65/461 |
| 5,064,785 A | * | 11/1991 | Kawamoto et al. ............. 501/72 |
| 7,803,731 B2 | | 9/2010 | Leed ............................... 501/36 |
| 2003/0166446 A1 | * | 9/2003 | Lewis .............................. 501/27 |
| 2004/0014586 A1 | | 1/2004 | Otaki et al. |
| 2005/0079970 A1 | * | 4/2005 | Otaki et al. ...................... 501/35 |
| 2006/0281622 A1 | * | 12/2006 | Maricourt et al. ............... 501/36 |
| 2007/0209401 A1 | | 9/2007 | Berthereau et al. |
| 2007/0243995 A1 | | 10/2007 | Dallies et al. |
| 2007/0298957 A1 | | 12/2007 | Otaki et al. |
| 2008/0125304 A1 | | 5/2008 | Berthereau et al. |
| 2008/0161177 A1 | * | 7/2008 | Bauer et al. ..................... 501/35 |
| 2009/0286440 A1 | | 11/2009 | Lecomte et al. |

FOREIGN PATENT DOCUMENTS

| | | |
|---|---|---|
| EP | 0 516 354 | 12/1992 |
| EP | 1 338 575 | 8/2003 |
| FR | 1 137 393 | 5/1957 |
| GB | 1 037 851 | 8/1966 |
| JP | 63 147843 | 6/1988 |
| JP | 63147843 A * | 6/1988 |
| JP | 11 29344 | 2/1999 |
| JP | 11029344 A * | 2/1999 |
| JP | 2006312706 A * | 11/2006 |
| RU | 2036869 C1 * | 6/1995 |
| RU | 2077515 C1 * | 4/1997 |
| WO | 92 06931 | 4/1992 |
| WO | WO 9206931 A1 * | 4/1992 |
| WO | 2008 142347 | 11/2008 |

OTHER PUBLICATIONS

U.S. Appl. No. 12/600,843, filed Mar. 23, 2010, Lalande, et al.

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

The invention relates to reinforcing glass strands, the composition of which comprises the following constituents within the limits defined below expressed as percentages by weight:

| | |
|---|---|
| $SiO_2$ | 62-72% |
| $Al_2O_3$ | 2-10% |
| CaO | 7-20% |
| MgO | 1-7% |
| $Na_2O + K_2O + Li_2O$ | 10-14.5% |
| $Li_2O$ | 0-2% |
| $BaO + SrO + ZnO$ | 0-4% |
| $B_2O_3$ | 0-4% |
| $F_2$ | 0-2% |
| $As_2O_3$ | 0-0.15% |

These strands are composed of a low-cost glass offering an excellent compromise between the mechanical properties represented by the tensile strength and the fiberizing conditions.
The invention also relates to the composites based on organic and/or inorganic material(s) and the aforementioned glass strands.

17 Claims, No Drawings

GLASS STRANDS WITH LOW ALUMINA CONTENT CAPABLE OF REINFORCING ORGANIC AND/OR INORGANIC MATERIALS

The present application is the US counterpart of WO 2009/0056768, the text of which is incorporated by reference and claims the priority of the French application No. 0758731 filed on Oct. 31, 2007, the text of which is incorporated by reference.

The invention relates to reinforcing glass strands and to composites based on organic and/or inorganic materials incorporating such glass strands.

The field of reinforcing glass strands is a very particular field of the glass industry.

The reinforcing glass strands are obtained by the method that consists in mechanically attenuating streams of molten glass emanating from orifices placed at the base of a bushing, generally heated by resistance heating, and in assembling said filaments to form the glass strand.

The strands are produced from specific glass compositions for obtaining filaments having a diameter of a few microns and for the formation of continuous strands suitable for performing the reinforcing function in organic and/or inorganic materials that is allotted to them, in order to impart better mechanical properties thereto. The reinforcing glass strands are used as such or in the form of organized assemblies such as fabrics.

The mechanical properties of these reinforced materials are mainly governed by the composition of the glass constituting the reinforcing strands. The most commonly known glasses for this use are "E" type glasses having the composition $SiO_2$—$Al_2O_3$—CaO of which the archetype is described in U.S. Pat. No. 2,334,981 and U.S. Pat. No. 2,571,074 and which have a composition essentially based on silica, alumina, lime and boric anhydride. The latter constituent, present in a content that varies from 5 to 13%, is added to replace silica, and it serves to fiberize the E-glass under highly advantageous conditions, particularly with a relatively low working temperature (temperature at which the glass has a viscosity equal to 1000 poise), of about 1200° C., a liquidus temperature about 120° C. lower than the working temperature, and a low devitrification rate.

The composition of the E-glass defined in the ASTM D 578-00 standard is the following (in weight percent): 52 to 56% $SiO_2$; 12 to 16% $Al_2O_3$; 16 to 25% CaO; 5 to 10% $B_2O_3$; 0 to 5% MgO; 0 to 2% $Na_2O+K_2O$; 0 to 0.8% $TiO_2$; 0.05 to 0.4% $Fe_2O_3$; and 0 to 1% $F_2$.

Boric anhydride $B_2O_3$, and also fluorine $F_2$, play the role of a flux in the mixture of batch materials, which, as already mentioned, allows the glass to be fiberized under better conditions. However, these constituents have the drawback of being volatile and of generating emissions of boron and fluorine which must necessarily be treated in pollution control installations before being released into the atmosphere. The implementation of this treatment leads to a high additional cost of the glass strands. Furthermore, the batch materials from which these constituents are obtained, in particular $B_2O_3$, which must account for at least 5% by weight of the glass, are relatively expensive.

The ASTM D 578-00 standard makes provision for other reinforcing strands of E-glass which may not contain boron. These strands, which are more particularly intended for producing woven fabrics for electronics, have the following composition (in weight percent): 52 to 62% $SiO_2$; 12 to 16% $Al_2O_3$; 16 to 25% CaO; 0 to 10% $B_2O_3$; 0 to 5% MgO; 0 to 2% $Na_2O+K_2O$; 0 to 1.5% $TiO_2$; 0.05 to 0.8% $Fe_2O_3$; and 0 to 1% $F_2$.

Numerous particular glass compositions meeting the latter standard have been proposed, mainly for the purpose of reducing the cost by decreasing the content of the most expensive constituents which are boron and fluorine (see, in particular, U.S. Pat. No. 3,847,626, U.S. Pat. No. 4,026,715, U.S. Pat. No. 4,199,364, WO 96/39362, WO 99/12858, WO 99/01393, WO 00/73232, WO 00/73231, WO 01/32576 and US 2003/0224922). The modified E-glass strands thus obtained retain a good aptitude of the glass for fiberzing, a low level of pollutant emissions, and properties compatible with use as reinforcement of organic and/or inorganic materials.

One objective of the present invention is to provide reinforcing strands composed of a glass having a different composition from that of E-glass, and that have a satisfactory level of mechanical performance, particularly in terms of tensile strength, and an advantageous cost.

Although it is not limited to this type of strands, the present invention relates more particularly to "fine" glass strands, that is to say ones that have a linear density less than or equal to 300 tex.

This objective is achieved according to the invention owing to glass strands having a lower alumina content, the composition of which comprises the following constituents in the limits defined below expressed as percentages by weight:

| | |
|---|---|
| $SiO_2$ | 62-72% |
| $Al_2O_3$ | 2-10% |
| CaO | 7-20% |
| MgO | 1-7% |
| $Na_2O + K_2O + Li_2O$ | 10-14.5% |
| $Li_2O$ | 0-2% |
| $BaO + SrO + ZnO$ | 0-4% |
| $B_2O_3$ | 0-4% |
| $F_2$ | 0-2% |
| $As_2O_3$ | 0-0.15% |

Silica $SiO_2$ is one of the oxides that forms the network of the glasses according to the invention, and plays an essential role in their stability. Within the context of the invention, when the silica content is below 62%, the glass obtained is not viscous enough and it devitrifies too easily during fiberizing. For contents above 72%, the glass becomes very viscous and difficult to melt. Preferably, the silica content is between 64 and 70.5%.

Alumina $Al_2O_3$ also constitutes a network former in the glasses according to the invention and plays a fundamental role with regard to the stability. The alumina content is limited to 10%, mainly for reasons of devitrification and for reducing the final cost of the glass. An alumina content of less than 2% causes a substantial increase in the hydrolytic attack of the glass. Preferably, the alumina content is greater than or equal to 3% and advantageously greater than or equal to 3.5%. The glass strands for which the alumina content is greater than or equal to 4%, advantageously greater than or equal to 5.5%, and better still greater than or equal to 6% are particularly preferred.

Advantageously, the sum of the silica and alumina contents is greater than 70.5% in order to obtain a satisfactory level of hydrolytic resistance. Preferably, the sum of the silica and alumina contents is less than or equal to 75% so as not to increase the melting point of the glass batch too much.

The CaO content makes it possible to adjust the viscosity and to control the devitrification of the glasses. In the context of the limits defined according to the invention, a CaO content greater than 20% increases the rate of devitrification to $CaSiO_3$ (wollastonite) prejudicial to good fiberizing. A content of less than 7% reduces the hydrolytic resistance of the glass in an unacceptable manner. Preferably, the CaO content is greater than or equal to 8%, and advantageously less than 12%.

The magnesia MgO content, together with the CaO content, makes it possible to reduce the liquidus temperature of the glass. The addition of MgO in the amount indicated makes it possible to introduce a competition between the growth of wollastonite crystals and the growth of diopside ($CaMgSi_2O_6$) crystals, this having the effect of reducing the rate of growth of these two types of crystals, and in the end of giving the glass a better devitrification resistance. Furthermore, the MgO helps to obtain a high hydrolytic resistance. The MgO content varies from 1 to 7%, preferably from 3.5 to 6.5%.

The alkali metal oxides, $Na_2O$, $K_2O$ and $Li_2O$, may be introduced into the composition according to the invention in order to limit devitrification and reduce the viscosity of the glass. However, the alkali metal oxide content must remain less than or equal to 14.5% so as not to degrade the hydrolytic resistance of the glass and to keep the mechanical properties of the strand at an acceptable level. The alkali metal oxide content is preferably less than 14%, advantageously greater than 10.5%, better still greater than 11% and even more advantageously greater than 11.5%. The $Li_2O$ content is generally less than 1%, advantageously less than or equal to 0.5%, in particular zero, predominantly for cost reasons. The addition of $Li_2O$ into the glass composition is advantageous for producing strands made from small-diameter filaments since it makes it possible to limit the deposition of the glass at the orifices located at the base of the bushing ("glazing") which disrupts the fiberizing.

BaO, SrO and ZnO may be present in the glass composition in a total content of less than 4%, preferably less than 2%, in order not to increase the cost. As a general rule, the composition is free of BaO, SrO and ZnO.

Boron oxide $B_2O_3$ acts as a flow promoter. Its content in the glass composition according to the invention is limited to 4%, preferably is less than or equal to 2%, to avoid problems of volatilization and pollutant emission, and to avoid significantly increasing the cost of the composition. The boron may be incorporated as a batch material in the form of glass strand waste containing boron, in particular E-glass. As a general rule, the compositions according to the invention are free of $B_2O_3$.

Fluorine may be added in small amounts to improve the melting of the glass, or may be present as an impurity issuing from the batch materials, but without exceeding 2%. Preferably, the fluorine content is less than 1% because a higher level may incur risks of pollutant emissions and corrosion of the furnace refractories. As a general rule, the compositions according to the invention are free of fluorine.

The glass composition may also comprise arsenic oxide $As_2O_3$ in an amount that does not exceed 0.15% in order to improve the refining of the glass. Arsenic oxide is used in addition to conventional refining agents such as sulfates on their own or combined with coke. Preferably, the $As_2O_3$ content is less than or equal to 0.13% and advantageously less than or equal to 0.07% so as to prevent the risk of pollutant emissions. As a general rule, the compositions according to the invention do not contain $As_2O_3$.

The glass strands according to the invention are obtained from glasses with the composition described above using the following process: a multiplicity of molten glass streams emanating from a multiplicity of orifices arranged at the base of one or more bushings are attenuated into the form of one or more webs of continuous strands, and then the filaments are assembled into one or more strands that are collected on a moving support.

Before they are assembled in the form of strand(s), the filaments are generally coated with a sizing composition that aims to protect them from abrasion and facilitate their subsequent association with the materials to be reinforced.

The moving support may be a rotating support when the strands are collected in the form of bound packages, or a support that moves translationally, when the strands are either chopped by a member that also serves to attenuate them, or when the strands are sprayed by a member serving to attenuate them in order to form a mat.

These strands may undergo conversion operations, for example with a view to "bulking" them, to impart a twist to them or to assemble them to form strands having an even higher linear density. The strands may thus be in various forms: continuous or chopped strands, meshes, woven fabrics, knits, braids, ribbons or mats. Preferably, the strands are assembled into structures having the shape of meshes, woven fabrics and mats.

Strands having a linear density less than or equal to 300 tex, preferably less than or equal to 200 tex, are more particularly targeted by the present invention. These strands, intended to be used in textile applications, advantageously have a filament diameter less than or equal to 11 microns, preferably less than or equal to 9 microns. They are usually twisted and/or stranded and coated with a specific size enabling them to withstand weaving operations.

Strands of higher diameter and linear density, preferably without twist, are more particularly suitable for reinforcing plastics. Their linear density may vary to a larger extent and the diameter of the filaments that constitute them may range up to 30 µm.

The molten glass feeding the bushings is obtained from pure batch materials (for example, originating from the chemical industry) or more generally natural batch materials (the latter sometimes containing impurities in trace amounts), these batch materials being mixed in appropriate proportions in order to obtain the desired composition, and then melted. The temperature of the molten glass (and therefore its viscosity) is conventionally set so as to allow the fiberizing, while avoiding problems of devitrification.

The "forming range" denoted by $\Delta T$, forms part of the fiberizing evaluation criteria. It corresponds to the difference between the forming temperature of the strands (denoted by $T_{log\ \eta=3}$) and the liquidus temperature (denoted by $T_{liq}$) and it is representative of the ability of a molten glass composition to crystallize. As a general rule, the risk of devitrification during the attenuation of the filaments is avoided when the fiberizing range $\Delta T$ is positive, preferably greater than or equal to 50° C.

The term "working temperature" is understood to mean the temperature at which the glass has a viscosity equal to 1000 poise (denoted by $T_{log\ 3}$). The term "liquidus temperature" (denoted by $T_{liq}$) is understood to mean the temperature at which the most refractory phase, which may devitrify in the glass, has a zero growth rate and thus corresponds to the melting point of this devitrified phase. The liquidus temperature therefore gives the lower temperature limit below which it is possible to fiberize the glass.

The glass strands according to the invention may be fiberized under particularly advantageous conditions due to the fact that the forming range is high, at least equal to 70° C., preferably at least equal to 80° C., and possibly ranging up to 135° C.

Additionally, the forming temperature $T_{log\ 3}$ is relatively low, at most equal to 1240° C., which has the advantage of not having to heat the glass too intensely and of minimizing the wear of the bushing. Preferably, the forming temperature is at most equal to 1230° C. and better still at most equal to 1220° C.

The glass strands according to the invention may be associated with filaments of organic material, either during attenuation to form composite strands, or after the formation of the glass strand in a subsequent step to form mixed strands.

The glass strands according to the invention are intended, in particular, to be used as components for reinforcing composite parts based on organic and/or inorganic material(s). In the composites, the glass strands according to the invention may represent only one portion of the glass strands or all of these strands.

The following examples allow the invention to be illustrated without however limiting it.

EXAMPLES 1 TO 10

Glasses were prepared having the composition appearing in Table 1, expressed as percentages by weight. The compositions of Examples 1 to 3 correspond to glasses that were melted, and the compositions of Examples 4 to 10 were obtained by calculation using a model established by the Applicant.

Glass strands (filament diameter: 9 μm and linear density: 68 and 34 tex; filament diameter: 7 μm and linear density: 22 tex) were obtained in a conventional fiberizing installation from the glasses from Examples 1, 2 and 3, and from conventional E-glasses with boron (Reference 1) and without boron (Reference 2). The glass filaments were coated with a traditional sizing composition before they were assembled into strands. The amount of size deposited represented around 0.7 to 1.1% of the weight of the final strand.

Listed in Table 1 are:
- the working temperature, $T_{log\ 3}$ corresponding to the temperature at which the viscosity of the glass is equal to $10^3$ poise;
- the liquidus temperature, $T_{liq}$ corresponding to the temperature at which the most refractory phase, which may devitrify in the glass, has a zero growth rate and thus corresponds to the melting point of this devitrified phase;
- the fiberizing range, ΔT corresponding to the temperature difference between $T_{log\ 3}$ and $T_{liq}$; and
- the individual tensile strength of the strand (ITS), measured under the conditions of the ISO 3341 standard.

The fiberizing range of the glasses according to the invention is greater than that of the E-glass without boron (Reference 2), and close to that of the E-glass with boron (Reference 1) for Examples 7 and 9, even greater for Example 8. The working temperature and the liquidus temperature of Examples 1 to 10 are compatible with the customary conditions for fiberizing E-glasses.

The individual tensile strength of the strand from Examples 1 to 3, before twisting, is high enough to allow the strand to be used in textile weaving operations.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ref. 1 | Ref. 2 |
|---|---|---|---|---|---|---|---|---|---|---|---|---|
| $SiO_2$ (%) | 66.20 | 65.60 | 66.50 | 66.00 | 66.50 | 66.50 | 66.50 | 66.50 | 66.50 | 68.00 | 55.40 | 60.50 |
| $Al_2O_3$ (%) | 6.50 | 6.00 | 6.60 | 6.50 | 6.50 | 6.50 | 6.50 | 6.50 | 6.50 | 6.50 | 13.90 | 13.00 |
| CaO (%) | 9.80 | 9.80 | 9.90 | 10.00 | 10.00 | 9.00 | 8.00 | 8.00 | 10.0 | 8.00 | 22.40 | 22.60 |
| MgO (%) | 4.30 | 4.40 | 4.00 | 4.00 | 4.00 | 4.00 | 6.00 | 6.00 | 4.00 | 6.00 | 0.70 | 3.00 |
| $Na_2O + K_2O + Li_2O$ (%) | 12.20 | 11.95 | 12.60 | 14.10 | 12.90 | 13.45 | 12.45 | 12.50 | 12.45 | 11.00 | 0.70 | <1.00 |
| $Li_2O$ (%) | 0 | 0 | 0.50 | 0.50 | 0.30 | 0.35 | 0.35 | 0.1 | 0 | 0.90 | 0 | 0 |
| $B_2O_3$ (%) | 0 | 0 | 0 | 0 | 0 | 0 | 0 | 0 | 0 | 0 | 5.80 | 0 |
| F (%) | 0.40 | 1.00 | 0 | 0 | 0 | 0.10 | 0 | 0 | 0.50 | 0 | 0 | 0 |
| $As_2O_3$ (%) | 0.07 | 0.13 | 0 | 0 | 0 | 0 | 0 | 0 | 0 | 0 | 0 | 0 |
| $T_{log3}$ (° C.) | 1229 | 1216 | 1197 | 1174 | 1214 | 1224 | 1208 | 1235 | 1219 | 1239 | 1200 | 1265 |
| $T_{liq}$ (° C.) | 1130 | 1130 | n.d. | 1090 | 1128 | 1123 | 1096 | 1105 | 1101 | 1138 | 1080 | 1190 |
| ΔT (° C.) | 99 | 86 | n.d. | 84 | 86 | 101 | 112 | 130 | 118 | 101 | 120 | 75 |
| ITS (N/tex) | | | | | | | | | | | | |
| 68 tex/9 μm | 0.50 | 0.40 | 0.40 | — | — | — | — | — | — | — | 0.60 | 0.60 |
| 34 tex/7 μm | 0.50 | 0.40 | — | — | — | — | — | — | — | — | — | — |
| 22 tex/7 μm | — | — | 0.65 | — | — | — | — | — | — | — | — | — | n.d.: not determined

The invention claimed is:

1. A reinforcing glass strand, consisting essentially of the following constituents expressed as percentages by weight:

| | |
|---|---|
| $SiO_2$: | 62-72% |
| $Al_2O_3$: | 3-10% |
| CaO: | 7-20% |
| MgO: | 1-7% |
| $Na_2O + K_2O + Li_2O$: | 10-14.5% |
| $Li_2O$: | 0-2% |
| BaO + SrO + ZnO: | 0-4% |
| $B_2O_3$: | 0-4% |
| $F_2$: | 0-2%, and |
| $As_2O_3$: | 0-0.15%. |

2. The glass strand as claimed in claim 1, wherein the $SiO_2$ content is from 64 to 70.5%.

3. The glass strand as claimed in claim 1 wherein the $Al_2O_3$ content is greater than or equal to 3.5.

4. The glass strand as claimed in claim 3, wherein the $Al_2O_3$ content is greater than or equal to 4%.

5. The glass strand as claimed in claim 1, wherein a sum of the $SiO_2$ and $Al_2O_3$ contents is greater than 70.5%.

6. The glass strand as claimed in claim 1, wherein the CaO content is greater than or equal to 8%.

7. The glass strand as claimed in claim 1, wherein the MgO content is in a range of from 3.5 to 6.5%.

8. The glass strand as claimed in claim 1, wherein the content of alkali metal oxides $Na_2O$, $K_2O$ and $Li_2O$ is less than 14%.

9. The glass strand as claimed in claim 1, wherein the $Li_2O$ content is less than 1%.

10. The glass strand as claimed in claim 1, wherein the content of BaO, SrO and ZnO is less than 2%.

11. The glass strand as claimed in claim 1, wherein the $B_2O_3$ content is less than or equal to 2%.

12. The glass strand as claimed in claim 1, wherein the fluorine content is less than 1%.

13. The glass strand as claimed in claim 1, wherein the $As_2O_3$ content is less than or equal to 0.13%.

14. The glass strand as claimed in claim 1, wherein the glass strand has a linear density less than or equal to 300 tex.

15. The glass strand as claimed in claim 14, wherein the glass strand has a filament diameter less than or equal to 11 microns.

16. A composite comprising a glass strand and at least one of organic material and inorganic material, wherein the composite comprises a glass strand according to claim 1.

17. The glass strand as claimed in claim 1, wherein the $Al_2O_3$ content is greater than or equal to 6%.

* * * * *